(12) United States Patent
Munk-Hansen

(10) Patent No.: US 11,353,006 B2
(45) Date of Patent: Jun. 7, 2022

(54) WIND TURBINE

(71) Applicant: SIEMENS GAMESA RENEWABLE ENERGY A/S, Brande (DK)

(72) Inventor: Thorkil Munk-Hansen, Fredericia (DK)

(73) Assignee: SIEMENS GAMESA RENEWABLE ENERGY A/S, Brande (DK)

( * ) Notice: Subject to any disclaimer, the term of this patent is extended or adjusted under 35 U.S.C. 154(b) by 573 days.

(21) Appl. No.: 16/248,006

(22) Filed: Jan. 15, 2019

(65) Prior Publication Data

US 2019/0219030 A1 Jul. 18, 2019

(30) Foreign Application Priority Data

Jan. 17, 2018 (EP) .................................. 18152074

(51) Int. Cl.
| | |
|---|---|
| *F03D 80/80* | (2016.01) |
| *F03D 7/02* | (2006.01) |
| *F03D 13/20* | (2016.01) |
| *F16F 9/10* | (2006.01) |
| *F03D 80/00* | (2016.01) |

(52) U.S. Cl.
CPC ........... *F03D 7/0296* (2013.01); *F03D 13/20* (2016.05); *F03D 80/00* (2016.05); *F03D 80/80* (2016.05); *F16F 9/103* (2013.01); *F05B 2240/912* (2013.01); *F05B 2260/964* (2013.01); *F16F 2222/12* (2013.01); *F16F 2224/04* (2013.01); *F16F 2234/00* (2013.01); *F16F 2238/04* (2013.01)

(58) Field of Classification Search
None
See application file for complete search history.

(56) References Cited

U.S. PATENT DOCUMENTS

| | | |
|---|---|---|
| 3,382,629 A | 5/1968 | Reutlinger |
| 4,951,441 A | 8/1990 | Noji et al. |
| 6,626,642 B1 | 9/2003 | Veldkamp |
| 6,672,837 B1 * | 1/2004 | Veldkamp ................. F16F 7/10 416/144 |
| 6,695,588 B1 | 2/2004 | Nielsen et al. |

(Continued)

FOREIGN PATENT DOCUMENTS

| | | |
|---|---|---|
| CN | 1320194 A | 10/2001 |
| CN | 1668501 A | 9/2005 |

(Continued)

OTHER PUBLICATIONS

European Search Report dated Jul. 19, 2018 for Application No. 18152074.3.

*Primary Examiner* — Kayla Mccaffrey
(74) *Attorney, Agent, or Firm* — Schmeiser, Olsen & Watts LLP

(57) ABSTRACT

A wind turbine is provided, including a container, a fluid which is arranged inside the container, and a damping body which is arranged inside the container, which is immersed in the fluid, and which is configured to move inside the container, wherein the fluid and the damping body are configured to damp oscillations of the wind turbine. A damper system is provided that on the one hand the fluid damps, e.g. by sloshing, and on the other hand the damping body damps by moving at least partially through the fluid.

15 Claims, 14 Drawing Sheets

(56) References Cited

U.S. PATENT DOCUMENTS

| | | | |
|---|---|---|---|
| 7,971,397 B2* | 7/2011 | Georgakis | F16F 7/10 |
| | | | 52/167.2 |
| 10,161,387 B2* | 12/2018 | Frydendal | F03D 13/20 |
| 2004/0112267 A1 | 6/2004 | Gorman, III | |
| 2006/0147306 A1 | 7/2006 | Zheng et al. | |
| 2010/0021303 A1 | 1/2010 | Nielsen et al. | |
| 2011/0260379 A1 | 10/2011 | Copf, Sr. et al. | |
| 2013/0280064 A1* | 10/2013 | van Steinvoren | F03D 13/35 |
| | | | 416/1 |
| 2015/0167643 A1 | 6/2015 | Jensen | |
| 2019/0063063 A1* | 2/2019 | Mechineau | E04H 9/0215 |

FOREIGN PATENT DOCUMENTS

| | | | |
|---|---|---|---|
| CN | 103047335 A | | 4/2013 |
| CN | 105133743 A | | 12/2015 |
| CN | 105863097 A | | 8/2016 |
| CN | 105926796 A | | 9/2016 |
| CN | 106703246 A | * | 5/2017 |
| CN | 206582279 U | | 10/2017 |
| DE | 1559243 A1 | | 9/1969 |
| DE | 102008015106 A1 | | 9/2009 |
| EP | 1203155 A1 | | 5/2002 |
| EP | 1677003 A2 | | 7/2006 |
| EP | 1 855 000 A1 | | 11/2007 |
| EP | 1855000 A1 | | 11/2007 |
| EP | 2884095 | | 6/2015 |
| EP | 2884095 A1 | | 6/2015 |
| EP | 2889471 A1 | | 7/2015 |
| WO | 2008119352 | | 10/2008 |
| WO | WO 2008119352 A2 | | 10/2008 |

* cited by examiner

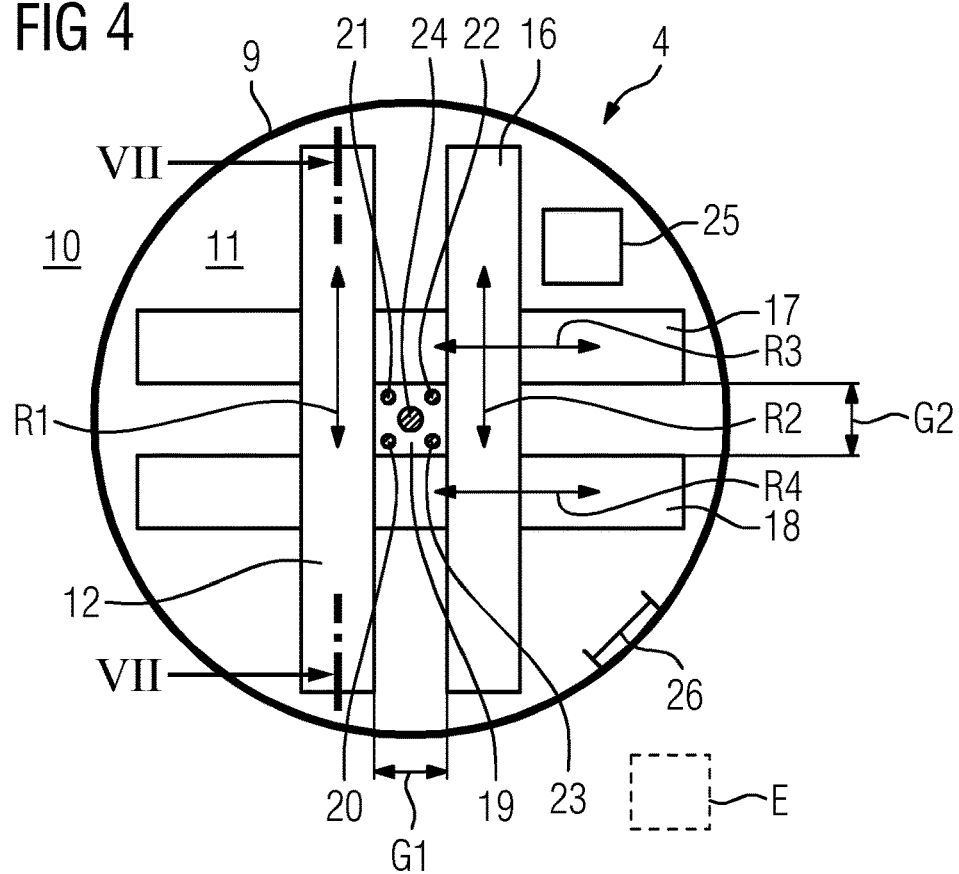
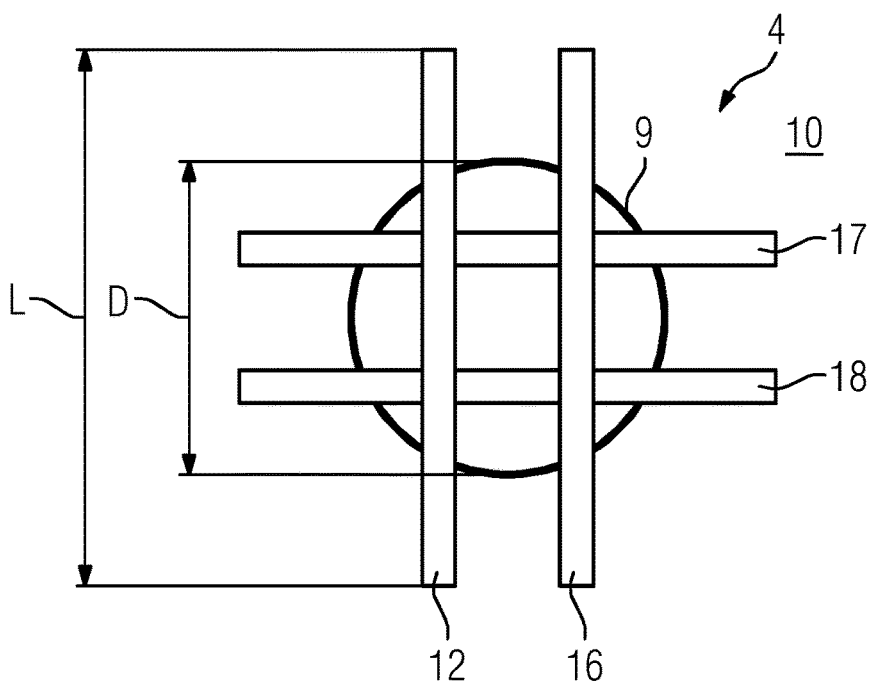

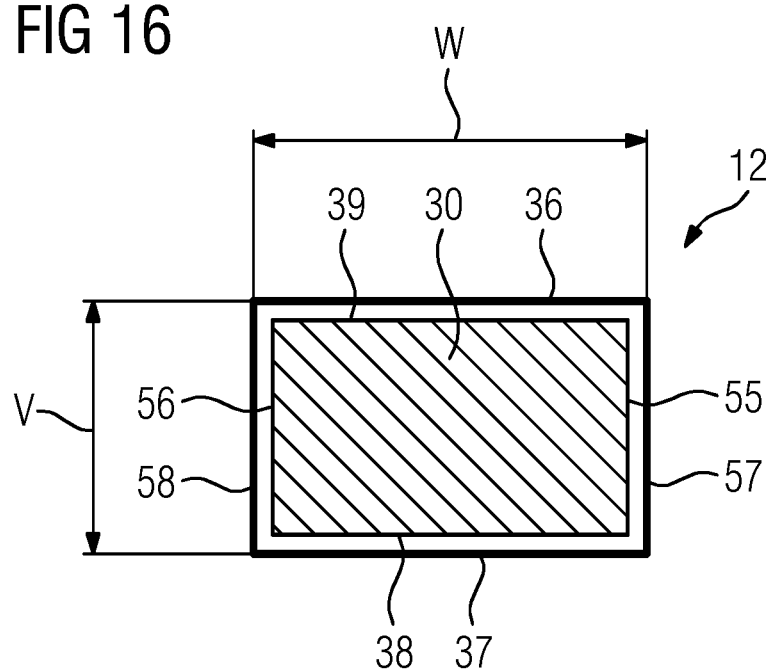
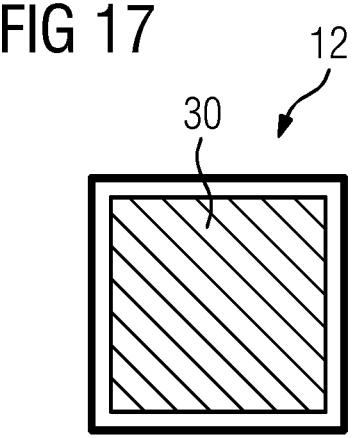
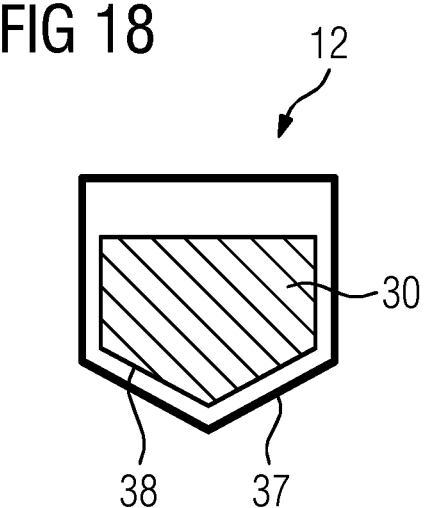

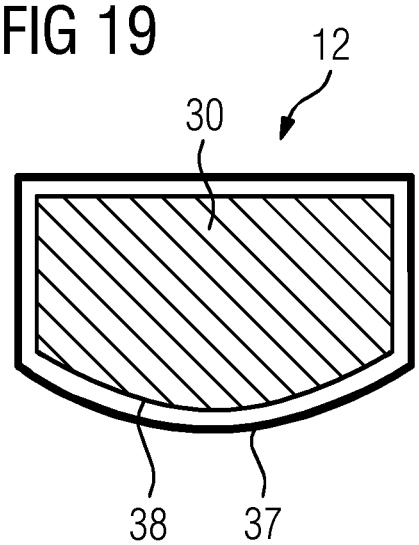
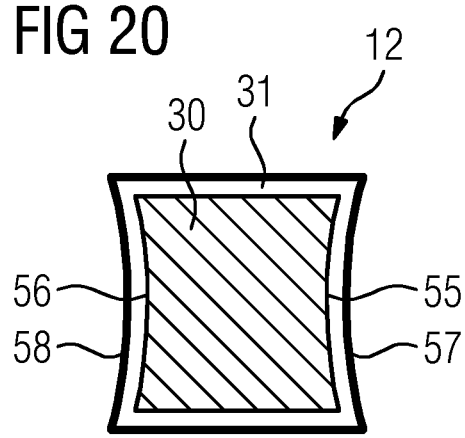
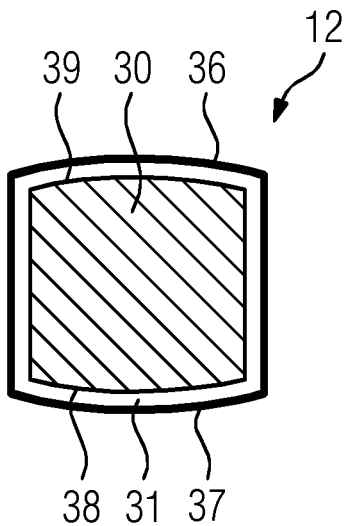
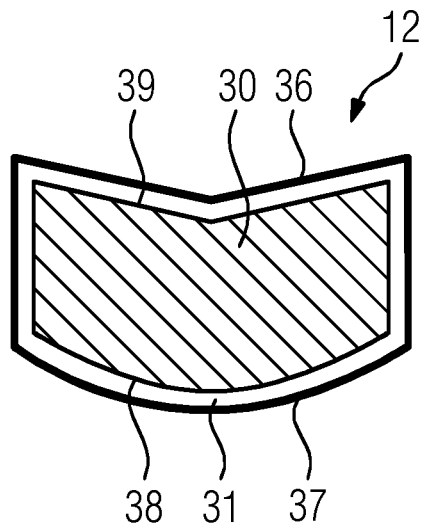

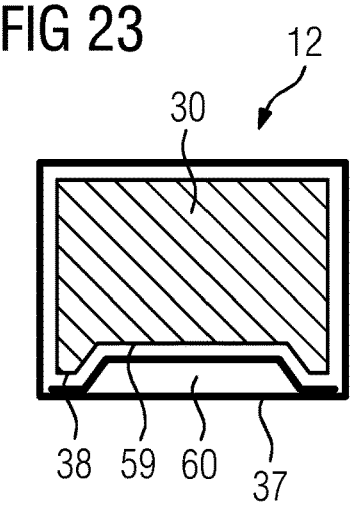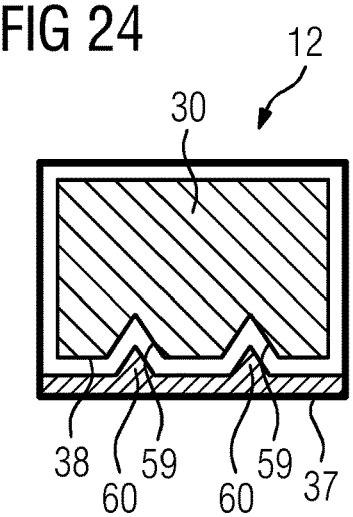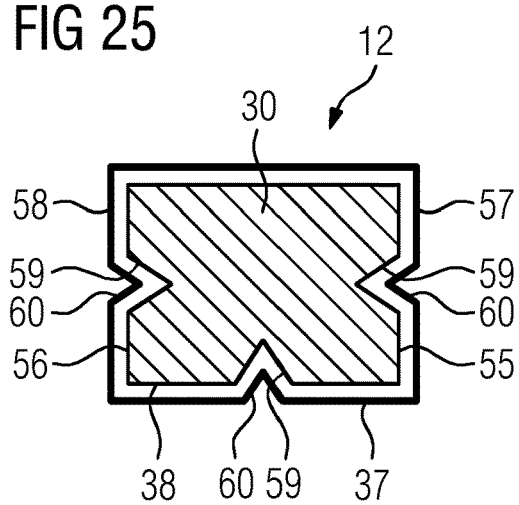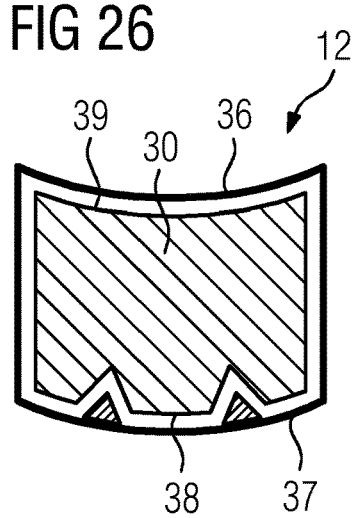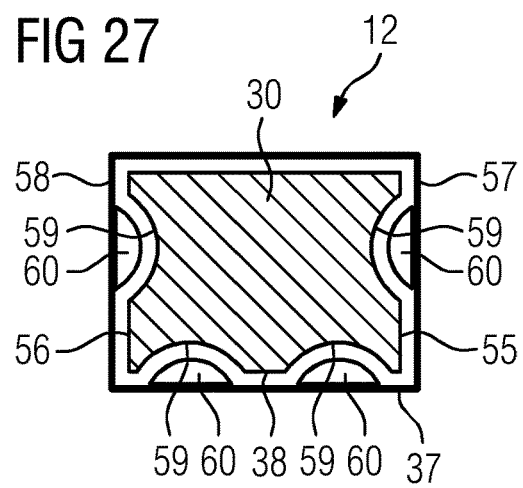

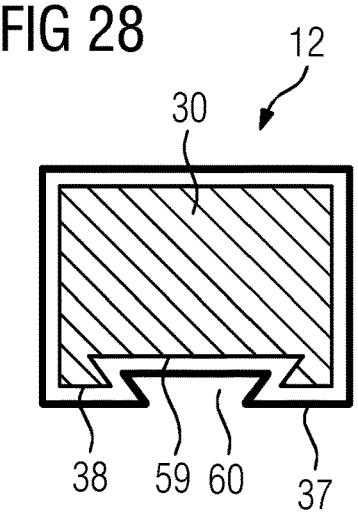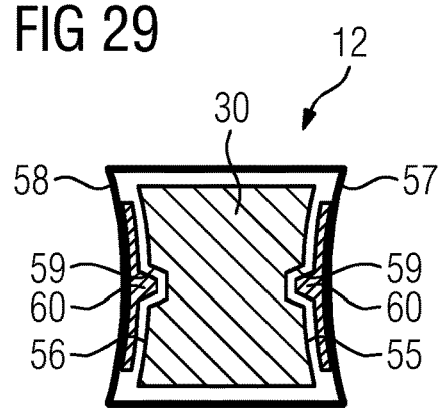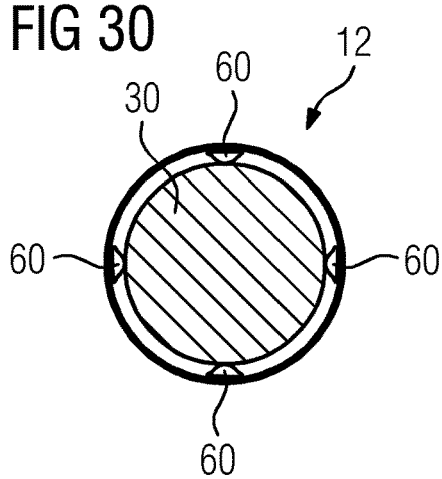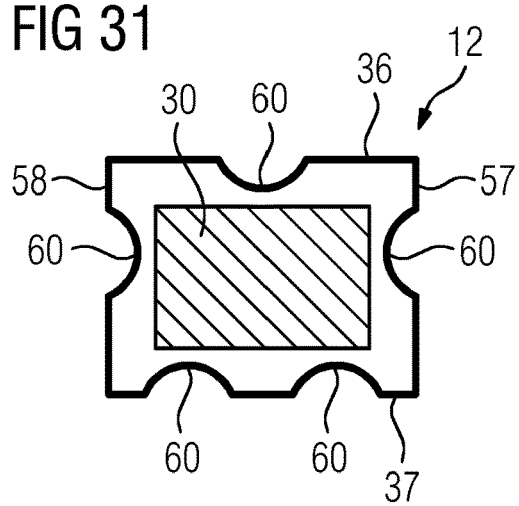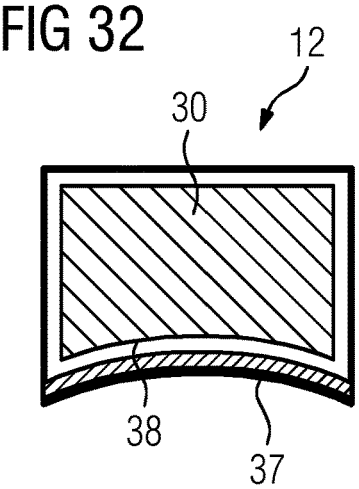

＃ WIND TURBINE

CROSS-REFERENCE TO RELATED APPLICATIONS

This application claims priority to European application No. EP 18152074.3, having a filing date of Jan. 17, 2018, the entire contents of which are hereby incorporated by reference.

FIELD OF TECHNOLOGY

The following relates to a wind turbine.

BACKGROUND

Modern wind turbines may comprise a tower, a nacelle which is connected to the tower, a hub which is connected to the nacelle and rotor blades which are connected to the hub. Such wind turbines may have heights of over 100 or 200 meters. Thus, e.g. due to wind loads, movements of an upper end of the tower and the nacelle may occur. This result in oscillations of the wind turbine. With increasing hub heights and/or more slender tower structures there is an increased demand to find optimal solutions for damping such tower oscillations to prevent turbine failures, as these movements result in huge loads in e.g. a yaw system, a drive train, a gearbox and/or the tower itself. However, modern wind turbines are weakly damped structures. The main damping may result from the aerodynamic forces induced by the vibrational motion of the rotor.

EP 1 855 000 A1 shows a fluid sloshing damper which includes at least one hollow body with an internal space and a fluid contained in the internal space. A hollow bulge extends outwards from a wall of the hollow body. The hollow bulge forms a bulge space which is part of the internal space.

SUMMARY

An aspect relates to an improved wind turbine.

Accordingly, a wind turbine is provided. The wind turbine comprises a container, a fluid which is arranged inside the container, and a damping body which is arranged inside the container, which is immersed in the fluid, and which is configured to move inside the container, wherein the fluid and the damping body are configured to damp oscillations of the wind turbine.

In contrast to known wind turbines, a more effective damper system is provided since on the one hand the fluid damps, e.g. by sloshing, and on the other hand the damping body damps by moving at least partially through the fluid. Damping of oscillations at the wind turbines will in general reduce the fatigue loads on the tower. This has the advantage that the necessary amount of steel in the tower may be reduced. Moreover, volume need is reduced compared to other damper systems.

The container, the fluid and the damping body may be comprised by a damper system of the wind turbine. Such a damper system should be able to provide effective damping even when the wind turbine is in a stand still operation mode and even when the wind turbine is not connected to a power source. Thus, the damper system may be operated without any energy requiring means (i.e. an electrical induced system). In particular, the damper system is a passive system. This may mean that no actuator is provided for influencing a movement of the damping body and/or fluid. Alternatively, the damper system may be provided semi-active, e.g. having an actuator configured to influence a movement of the damping body and/or fluid.

"Wind turbine" presently refers to an apparatus converting the wind's kinetic energy into rotational energy, which may again be converted into electrical energy by the apparatus. The wind turbine comprises a tower, a nacelle which is connected to an upper end of the tower, a hub which is rotatably connected to the nacelle, and rotor blades which are connected to the hub.

The damping body is a sliding element which is configured to slide inside the container for damping oscillations of the wind turbine. The damping body is a solid body. In particular, the damping body may be named damping mass. In particular, the container has an elongated shape, wherein a length of the container is at least two, three, four, five, six, seven, eight, nine or even ten times larger than a width and/or height of the container. The container comprises a solid waterproof housing which houses the damping body and the fluid. The fluid comprises oil or water.

According to an embodiment, the container and the damping body are configured such that a full rotation of the damping body inside the container is prevented.

This has the advantage that, for example, rolling friction is essentially prevented. Sliding friction has the advantage over rolling friction that more kinetic energy may be transferred into thermal energy and, thus, an increased damping effect may be achieved. A length of the damping body is larger than the height of the inner space of the container containing the damping body.

According to a further embodiment, the wind turbine further comprises a tower, wherein the container is arranged inside the tower.

It is understood that the damping body and the fluid are arranged inside the container and, thus, are arranged also inside the tower. The container is arranged at an upper or uppermost third, fourth, fifth, sixth, seventh, eighth, ninth or tenth of a height of the tower. In particular, the container is arranged at an upper end of the tower. This has the advantage that oscillations of the tower may be damped at a high oscillation amplitude.

According to a further embodiment, the container may be arranged at or inside the nacelle.

According to a further embodiment, a cross-section of the damping body fills at least 30%, 40%, 50%, 60%, 70%, 80, 90, 95 or 98% of a cross-section of the container.

Thus, the inner space of the container may be used effectively. A longitudinal section of the damping body fills less than 70%, 60%, 50%, 40%, 30%, 20%, 15%, 10% or 5% of a longitudinal section of the container.

According to a further embodiment, the container comprises a sliding surface for the damping body, wherein the sliding surface has a curved shape.

Thus, the damping body is configured to slide on a curved sliding surface. The sliding surface of the container forms a sliding path for the damping body. A lowest point of the sliding path is arranged midway along the length of the container. This has the advantage that due to gravitation the damping body is forced towards a center of the container.

According to a further embodiment, a sliding surface of the damping body has a curved shape. This has the advantage that in case of a curved sliding surface of the container a larger contact area between the sliding surface of the container and the sliding surface of the damping body may be achieved.

According to a further embodiment, the damping body has a square, pentagonal, rectangular and/or trapezoidal cross-sectional shape.

This has the advantage that an adaptation of the damping body to the inner space of the container may be improved. The inner space of the container has essentially the same cross-sectional shape as the damping body.

According to a further embodiment, one of the damping body and the container comprises a recess and the other of the damping body and the container comprises a guiding element which interacts with the recess for guiding the damping body along a length of the container.

This has the advantage that a movement of the damping body inside the container is well defined and, thus, reliably reproducible over a lifetime of the wind turbine. Moreover, the contact area between the sliding surface of the container and the sliding surface of the damping body may be increased. The recess and the guiding element extend along a respective length of the damping body and/or the container. In a cross-sectional view the recess is essentially formed as a negative form of the guiding element. In particular, the guiding element has a dovetail, triangular, quadrangular or trapezoidal cross-sectional shape.

According to a further embodiment, the container comprises an end portion and the damping body comprises an end portion for fitting into the end portion of the container, wherein the container and the damping body are configured such that fluid is dammed between an end face of the damping body and an end face of the container when the end portion of the damping body fits into the end portion of the container.

This has the advantage that a soft end stop for the damping body may be realized. Thus, inelastic collisions (shocks) between the damping body and the container may be prevented. It is understood that the end face of the damping body is comprised by the end portion of the damping body and the end face of the container is comprised by the end portion of the container. The damping body comprises two of such end portions and the container comprises two of such end portions such that the soft end stop is provided at both ends of the container.

According to a further embodiment, an inner space of the container comprises a height which is constant along the length of the container.

Hence, a production of the container is simplified. The inner space has essentially a cuboid shape. Alternatively, the inner space may have a curved shape.

According to a further embodiment, the inner space of the container comprises the height which decreases along the length of the container.

The height decreases from the middle of the container towards both end faces of the container.

According to a further embodiment, at least 10%, 20%, 30%, 40%, 50%, 60%, 70%, 80% or 90% of the inner space of the container is filled with the fluid.

Thus, a high damping effect may be achieved due to the fluid.

According to a further embodiment, the wind turbine further comprises a first container and a first damping body which is arranged with the fluid inside the first container, and a second container and a second damping body which is arranged with the fluid inside the second container.

The afore-mentioned container is the first container and the afore-mentioned damping body is the first damping body. A third container and a third damping body which is arranged with the fluid inside the third container is provided. In particular, a fourth container and a fourth damping body which is arranged with the fluid inside the fourth container is provided. A fifth container and a fifth damping body which is arranged with the fluid inside the fifth container is provided. In particular, a sixth container and a sixth damping body which is arranged with the fluid inside the sixth container is provided.

According to a further embodiment, the first container crosses the second container.

This has the advantage that effective damping may be provided in two directions. In particular, both the first container and the second container cross a longitudinal middle axis of the tower. Hence, the first container and the second container may be provided as long as possible since the best room use (e.g. at the inner space of the tower) may be achieved.

According to a further embodiment, the first container is arranged parallel to the second container.

Thus, the damping effect in one direction may be increased. In this case the first container and the second container do not cross the longitudinal middle axis of the tower.

According to a further embodiment, the wind turbine further comprises a cable which is arranged between the first container and the second container.

The cable is comprised by a harness extending from the nacelle towards a lower end of the tower. The cable is provided for conducting electrical energy from the nacelle to an electric supply network located outside the wind turbine. The cable harness further comprises signal cables. In particular, the longitudinal middle axis of the tower extends through the cable or the cable harness. This has the advantage that the cable or the cable harness does not require much space when the nacelle rotates relative to the tower.

The embodiments and features described with reference to the first container and the first damping body apply mutatis mutandis to the second, third, fourth, fifth and/or sixth container and damping body.

Further possible implementations or alternative solutions of embodiments of the invention also encompass combinations—that are not explicitly mentioned herein—of features described above or below with regard to the embodiments. The person skilled in the art may also add individual or isolated aspects and features to the most basic form of embodiments of the invention.

BRIEF DESCRIPTION

Some of the embodiments will be described in detail, with references to the following Figures, wherein like designations denote like members, wherein:

FIG. 4 shows the cross-section II-II from FIG. 1 of a further embodiment of a tower;

FIG. 5 shows the cross-section II-II from FIG. 1 of a further embodiment of a tower;

FIG. 16 shows a cross-section XVI-XVI from FIG. 7 of a first embodiment of the container;

FIG. 17 shows a cross-section XVI-XVI from FIG. 7 of a second embodiment of the container;

FIG. 18 shows a cross-section XVI-XVI from FIG. 7 of a third embodiment of the container;

FIG. 19 shows a cross-section XVI-XVI from FIG. 7 of a fourth embodiment of the container;

FIG. 20 shows a cross-section XVI-XVI from FIG. 7 of a fifth embodiment of the container;

FIG. 21 shows a cross-section XVI-XVI from FIG. 7 of a sixth embodiment of the container;

FIG. 22 shows a cross-section XVI-XVI from FIG. 7 of a seventh embodiment of the container;

FIG. 23 shows a cross-section XVI-XVI from FIG. 7 of an eighth embodiment of the container;

FIG. 24 shows a cross-section XVI-XVI from FIG. 7 of a ninth embodiment of the container;

FIG. 25 shows a cross-section XVI-XVI from FIG. 7 of a tenth embodiment of the container;

FIG. 26 shows a cross-section XVI-XVI from FIG. 7 of an eleventh embodiment of the container;

FIG. 27 shows a cross-section XVI-XVI from FIG. 7 of a twelfth embodiment of the container;

FIG. 28 shows a cross-section XVI-XVI from FIG. 7 of a thirteenth embodiment of the container;

FIG. 29 shows a cross-section XVI-XVI from FIG. 7 of a fourteenth embodiment of the container;

FIG. 30 shows a cross-section XVI-XVI from FIG. 7 of a fifteenth embodiment of the container;

FIG. 31 shows a cross-section XVI-XVI from FIG. 7 of a sixteenth embodiment of the container;

FIG. 32 shows a cross-section XVI-XVI from FIG. 7 of a seventeenth embodiment of the container;

DETAILED DESCRIPTION

Figure 1:
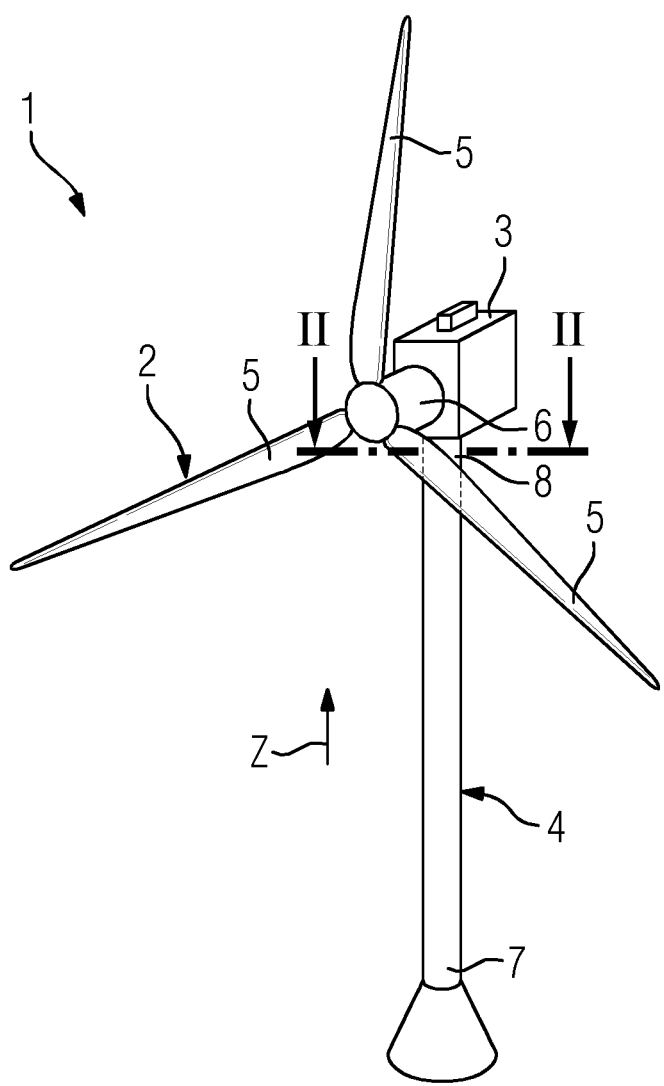
FIG. 1 shows a perspective view of a wind turbine according to one embodiment.

FIG. 1 shows a wind turbine 1. The wind turbine 1 comprises a rotor 2 connected to a generator (not shown) arranged inside a nacelle 3. The nacelle 3 is arranged at the upper end of a tower 4 of the wind turbine 1.

The rotor 2 comprises three wind turbine blades 5. The wind turbine blades 5 are connected to a hub 6 of the wind turbine 1. Rotors 2 of this kind may have diameters ranging from, for example, 30 to 200 meters or even more. The wind turbine blades 5 are subjected to high wind loads. At the same time, the wind turbine blades 5 need to be lightweight. For these reasons, wind turbine blades 5 in modern wind turbines 1 are manufactured from fiber-reinforced composite materials. Therein, glass fibers are generally preferred over carbon fibers for cost reasons. Oftentimes, glass fibers in the form of unidirectional fiber mats are used.

The tower 4 comprises a lower end 7 and an upper end 8, wherein the lower end 7 is averted from the nacelle 3. Further, the nacelle 3 is connected to the upper end 8 of the tower 4. When the wind turbine 1 e.g. is subjected to high wind loads, the upper end 8 together with the nacelle 3 moves away from a neutral position which results in oscillations. Usually, an amplitude of such an oscillation is larger at the upper end 8 than at the lower end 7. Thus, it may be useful to provide damper systems at the upper end 8 of the tower 4 or the nacelle 3.

Figure 2:
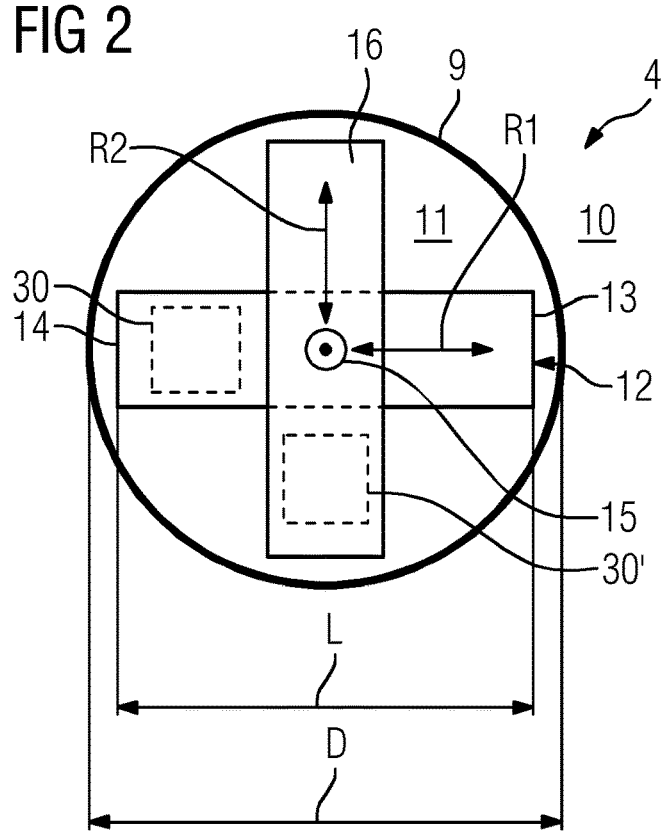
FIG. 2 shows a cross-section II-II from FIG. 1 of one embodiment of a tower.

FIG. 2 shows schematically a cross-section II-II of an embodiment of the tower 4 from FIG. 1 which intersects the upper end 8 (see FIG. 1) of the tower 4. In particular, FIG. 2 shows a top view to the inside of the tower 4. The tower 4 comprises a wall 9 which is an outermost wall of the tower 4 and, thus, faces an outer environment 10 of the wind turbine 1. The wall 9 has a circular ring-shaped cross-section and surrounds an inner space 11 of the tower 4. Further, a container 12 is provided inside the inner space 11.

The container 12 has essentially a rectangular shape when looking from above and is, in particular rigidly, connected to the tower 4 (not shown). Further, the container 12 comprises a first end face 13 (or end wall) and a second end face 14 (or end wall) both facing the wall 9 and averted from each other. A length L of the container 12 may be at least 50%, 60%, 70%, 80%, 90%, 95% or 98% of an inner diameter D of the wall 9. A fluid 29 (not shown) and a damping body 30 (also indicated as first damping body) are arranged inside the container 12 (see broken lines). The damping body 30 is immersed in the fluid 29 (see FIG. 7), and is configured to move inside the container 12, wherein the fluid 29 and the damping body 30 are configured to damp oscillations of the wind turbine 1. The container 12, the fluid 29 and the damping body 30 may be named damper system.

Further, a damping direction R1 extends from the end face 14 towards the end face 13 and vice versa. The container 12 is elongated towards the damping direction R1. The inner space 11 is essentially cylindrical and has a rotational symmetry regarding a middle axis 15, wherein the container 12 intersects the middle axis 15 of the inner space 11.

In particular, a further container 16 (also indicated as second container) is provided. The fluid 29 (not shown) and a damping body 30' (also indicated as second damping body) are arranged inside the container 16 (see broken lines). The damping body 30' is immersed in the fluid 29, and is configured to move inside the container 16, wherein the fluid 29 and the damping body 30' are configured to damp oscillations of the wind turbine 1. The container 12 and the container 16 may be identical, wherein a damping direction R2 of the container 16 is essentially perpendicular to the damping direction R1. Thus, the tower 4 may be damped in two directions R1, R2 perpendicular to each other. In particular, the containers 12, 16 are placed above one another optionally with a distance in between in vertical direction Z which also is a longitudinal direction of the tower 4 (see FIG. 1) but turned 90° relative to one another. The containers 12, 16 are placed as close to the nacelle 3 (see FIG. 1), i.e. at topmost possible point in the upper end 8 of the tower 4. Alternatively, the containers 12, 16 may be placed within the nacelle 3. The containers 12, 16 may be provided as pair of containers 12, 16.

Figure 3:
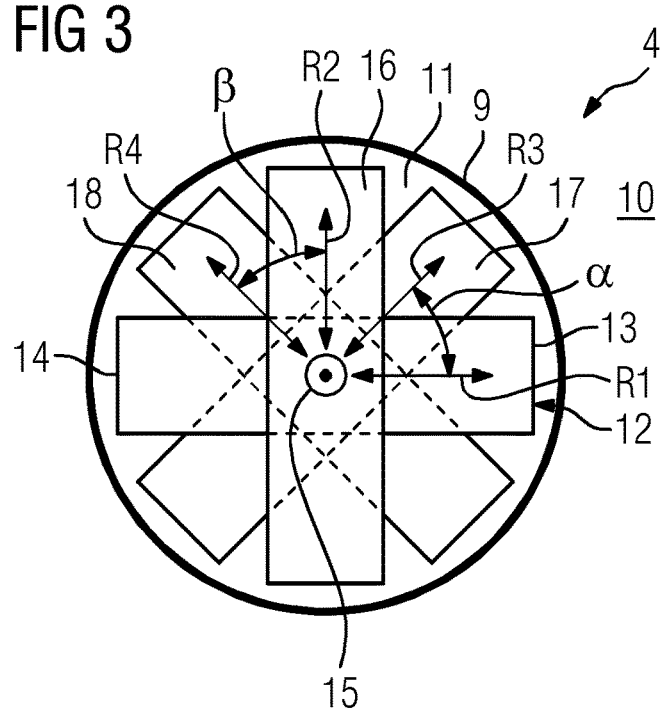
FIG. 3 shows the cross-section II-II from FIG. 1 of a further embodiment of a tower.

FIG. 3 shows schematically the cross-section II-II from FIG. 1 of a further embodiment of the tower 4. Two pairs of containers 12, 16, 17, 18 may be placed of one another at the upper end 8, in particular on top, of the tower 4, and each pair may be twisted relative to one another. An angle α between the damping direction R1 of container 12 and a damping direction R3 of container 17 may be between 30 and 60°, in particular 45°. An angle β between the damping direction R2 of container 16 and a damping direction R4 of container 18 may be between 30 and 60°, in particular 45°. For example, all containers 12, 16, 17, 18 are intersected by the middle axis 15.

Several of such pairs of containers 12, 16, 17, 18 may be placed of one another at the upper end 8, in particular on top, of the tower 4, and each pair may be twisted relative to one another. This has the advantage that effective damping in a plurality of directions may be ensured.

FIG. 4 shows schematically the cross-section II-II from FIG. 1 of a further embodiment of the tower 4. In contrast to FIG. 3, the containers 12, 16 are arranged parallel to each other forming a gap G1 in between. This means that damping directions R1, R2 are essentially parallel to each other. The containers 12, 16 are arranged in the same horizontal plane E which is essentially perpendicular the middle axis 15 (see FIG. 2). Further, containers 17, 18 are in particular also arranged parallel to each other and underneath containers 12, 16. In particular, a gap G2 is arranged between the containers 17, 18. The damping directions R1, R2 are arranged perpendicular to the damping directions R3, R4. The middle axis 15 is arranged between the containers 12, 16 and between the containers 17, 18 such that a central hollow space 19 is provided between the containers 12, 16, 17, 18.

Cables 20, 21, 22, 23, 24 extend through the central hollow space 19 along the middle axis 15. In particular, a central cable 24 intersects the middle axis 15. This has the advantage that a center of the tower 4 is not blocked. Thus, the cables 20, 21, 22, 23, 24 have an ideal location in case of a rotation of the nacelle 3 relative to the tower 4 (yaw movement). At least one essentially free hanging cable 20, 21, 22, 23, 24 is provided which may freely twist caused by yaw movement of the nacelle 3. A lift area 25 may be provided at a radially outer boundary area of the inner space 11. Alternatively, the lift area 25 may be provided along the middle axis 15, wherein the lift area extends through the central hollow space 19. In particular, a ladder area 26 is provided inside the inner space 11 at the wall 9.

The containers 12, 16, 17, 18 are placed in a fixed position, e.g. resting on support such as a platform or support beams (not shown) connected to the tower 4. In particular, in an alternative embodiment such support could also be designed to be movable, i.e. able to turn (0-360 deg.) in order to optimize the damping effect in accordance with a given prevailing (but changing) wind direction. The movement may be directly related to the yaw movement of the nacelle 3, or work independently. The latter is in particular useful when the yaw function of the nacelle 3 is damaged. Optimal damping is crucial especially at high wind speeds if the nacelle 3 is not facing towards the wind (for an upwind turbine).

The containers 12, 16 have for example the same distance to the middle axis 15 (see FIG. 2) and thus are balanced regarding a center of the tower 4 when locking from above. Also, the containers 17, 18 have for example the same distance to the middle axis 15 (see FIG. 2) and thus are balanced regarding the center of the tower 4.

FIG. 5 shows schematically the cross-section II-II from FIG. 1 of a further embodiment of the tower 4. In contrast to FIG. 4, the containers 12, 16, 17, 18 protrude from the wall 9 towards the outer environment 10 of the wind turbine 1. Further, the length L of the container 12, 16, 17, 18 is larger than the inner diameter D of the wall 9. Thus, the containers 12, 16, 17, 18 extends out of an outer skirt of the tower 4

Alternatively, the containers 12, 16, 17, 18 may in principle also be attached to an outer skirt of the tower 4, i.e. one or more individual containers 12, 16, 17, 18 or pairs of containers 12, 16, 17, 18 may be placed at various locations around the tower 4.

Figure 6:
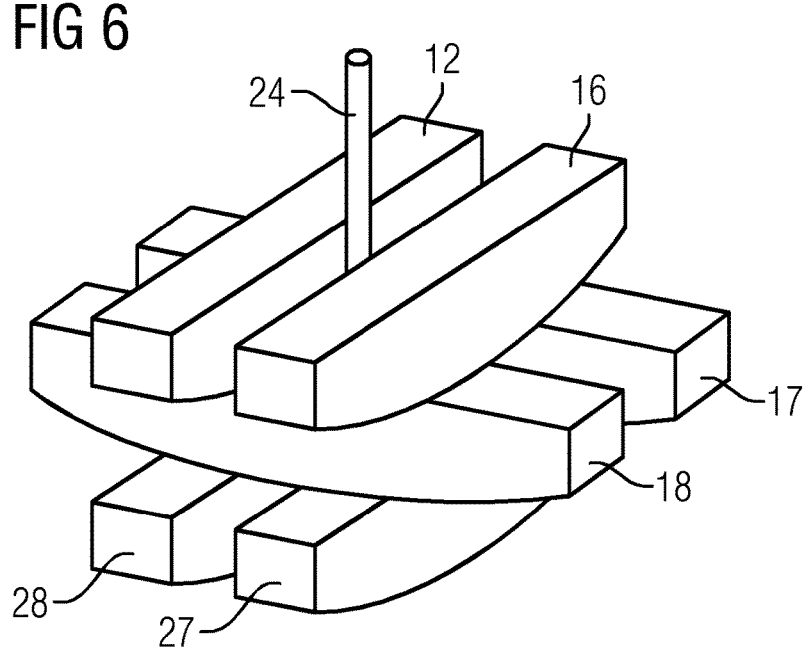
FIG. 6 shows a schematic perspective view of a plurality of containers.

FIG. 6 shows a schematic perspective view of a plurality of containers 12, 16, 17, 18, 27, 28 and the central cable 24 located between the containers 12, 16, 17, 18, 27, 28. In contrast to FIG. 4, a further pair of containers 27, 28 is provided underneath the containers 17, 18. The containers 27 28 are arranged parallel to the containers 12, 16. For example, the containers 17, 18 are stacked on the containers 27, 28 and the containers 12, 16 are stacked on the containers 17, 18. Moreover, further pairs of containers (not shown) may be stacked on the containers 12, 16. Each container 12, 16, 17, 18, 27, 28 is provided as a damper system.

Figure 7:
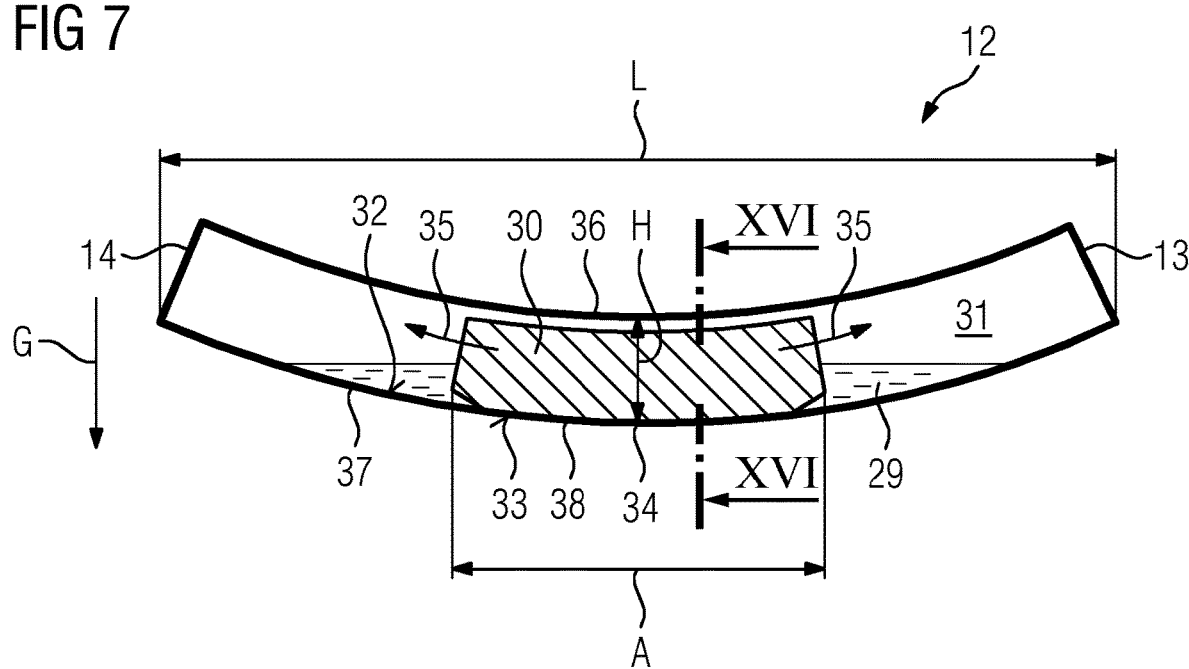
FIG. 7 shows a cross-section VII-VII from FIG. 4 of one embodiment of a container.

FIG. 7 shows a longitudinal section VII-VII from FIG. 4 of the container 12. As shown in FIG. 4 the fluid 29 and the damping body 30 are arranged inside the container 12. The damping body 30 is immersed in the fluid 29, and is configured to move inside the container 12, wherein the fluid 29 and the damping body 30 are configured to damp oscillations of the wind turbine 1. In particular, the container 12 and the damping body 30 are configured such that a full rotation of the damping body 30 inside the container 12 is prevented. Thus, rolling friction is essentially prevented. Sliding friction has the advantage over rolling friction that more kinetic energy may be transferred into thermal energy when comparing the same moving path 35 of the damping body 30. In particular, the moving path 35 extends essentially from the end face 13 to the end face 14 and vice versa. A length A of the damping body 30 is larger than the height H of an inner space 31 of the container 12 containing the damping body 30.

The container 12 comprises a floor face 37 (or floor wall) having a sliding surface 32 for the damping body 30, wherein the sliding surface 32 has a curved shape. The sliding surface 32 is concave when looking from above such that the damping body 30 is arranged inside a potential well. As shown in FIG. 7 the damping body 30 is arranged at the lowest point 34 of the sliding surface 32 which may be seen as position of rest for the damping body 30. Gravitation G forces the damping body 30 towards this rest position which is arranged midway between the end face 13 and the end face 14 and thus is a center position of the container 12. Further, a ceiling face 36 (or ceiling wall) of the container 12 may also have a curved shape. The ceiling face 36 is concave when looking from above. The ceiling face 36 is arranged opposite to the floor face 37. In some circumstances, the ceiling face 36 may also be a sliding surface interacting with the sliding body 30. The inner space 31 is surrounded by the end faces 13, 14, the floor face 37, the ceiling face 36 and side walls 57, 58 (see FIG. 16).

In particular, the inner space 31 may have a curved shape. A sliding surface 33 of the damping body 30 may have a curved shape. In particular, the damping body 30 is provided with a curved bottom face 38 comprising the sliding surface 33. Thus, in case of a curved sliding surface 32 a larger contact area between the sliding surface 32 and the sliding surface 33 of the damping body 30 may be achieved.

At least 10%, 20%, 30%, 40%, 50%, 60%, 70%, 80%, 90%, 95% or even more of the inner space 31 of the container 12 is filled with the fluid 29. A damping effect may be achieved when the damping body 30 moves through the fluid 29 while displacing the fluid 29. Further, the fluid 29 itself sloshes e.g. against the end faces 13, 14 and thus provides a further damping effect. Optionally, further damping may be achieved by sliding of the sliding surface 33 of the damping body 30 on the sliding surface 32 of the container 12.

Alternatively, the damping body 30 may float on the fluid 29 (see FIG. 8) such that the sliding surface 33 is in some instances not or permanently not in contact with the sliding surface 32 or the floor face 37. Thus, essentially no sliding friction would occur between the sliding surfaces 32, 33. In particular, the longitudinal section of the damping body 30 may be arch-shaped. The damping body 30 and the container 12 may have a similar curvature as to provide a smooth sliding motion from one end face 13 to the other end face 14 when the wind turbine 1 is oscillating.

The damping body 30 is capable to move, in particular to slide, within the container 12 from the end face 13 to the end face 14 in counteractive response to the tower oscillations. The moving path 35 of the damping body 30 is dictated by the shape and length L of the container 12 which may be fully filled with the fluid 29 (e.g. after the damping body 30 has been placed) or only partly filled with fluid 29. When the wind turbine 1 oscillates, i.e. moves in one direction away from its initial position, the damping body 30 and the fluid 29 will move opposite to this direction. As wind directions obviously change and the container 12 for example is placed in a fixed and locked position, it is advantageous to use at least two or more of these containers 12, 16, 17, 18, 27, 28 (see FIG. 2 to FIG. 6). When arranging containers 12, 16, 17, 18, 27, 28 perpendicular to one another, it is possible to cover an optimal damper system irrespectively of the wind direction (and thus the tower oscillation direction).

Figure 8:
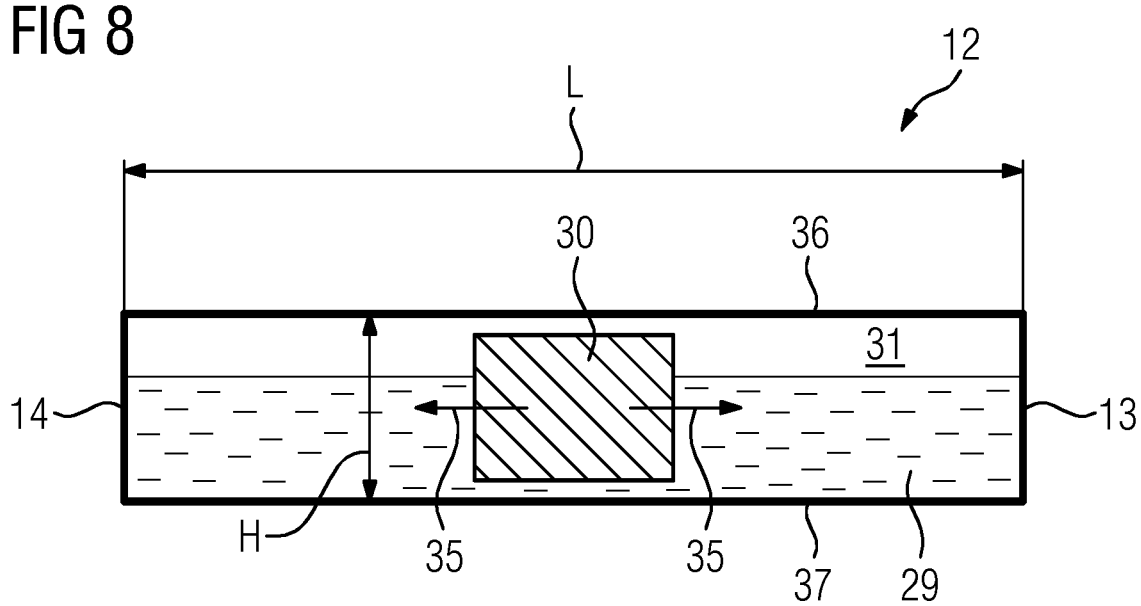
FIG. 8 shows a cross-section VII-VII from FIG. 4 of a further embodiment of the container.

FIG. 8 shows the longitudinal section VII-VII from FIG. 4 of a further embodiment of the container 12. In contrast to FIG. 7, the longitudinal section of the damping body 30 is essentially rectangular. Moreover, the ceiling face 36 and the floor face 37 are essentially flat. The inner space 31 of the container 12 comprises the height H which is constant along the length L of the container 12. A longitudinal section of the inner space 31 is rectangular.

Figure 9:
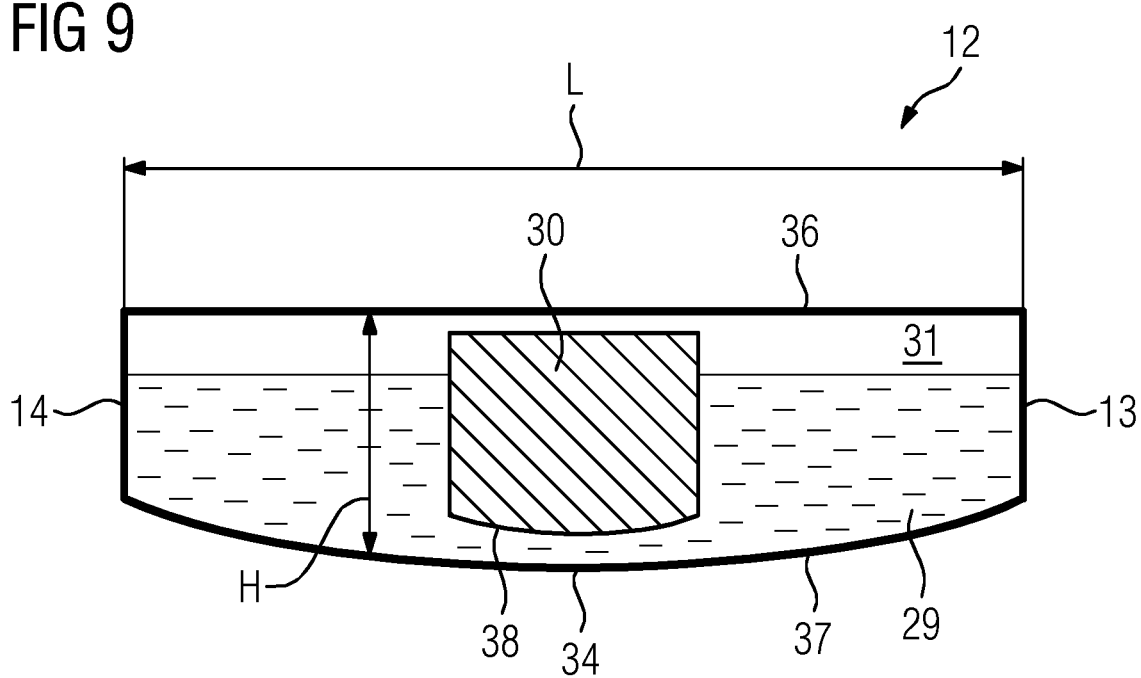
FIG. 9 shows a cross-section VII-VII from FIG. 4 of a further embodiment of the container.

FIG. 9 shows the longitudinal section VII-VII from FIG. 4 of a further embodiment of the container 12. In contrast to FIG. 8, the damping body 30 comprises a curved bottom face 38. The bottom face 38 is convex when looking from below. Moreover, the container 12 comprises a curved floor face 37. Further, the inner space 31 of the container 12 comprises the height H which is not constant along the length L of the container 12. The height H decreases from the lowest point 34 of the container 12 towards both end faces 13, 14.

Figure 10:
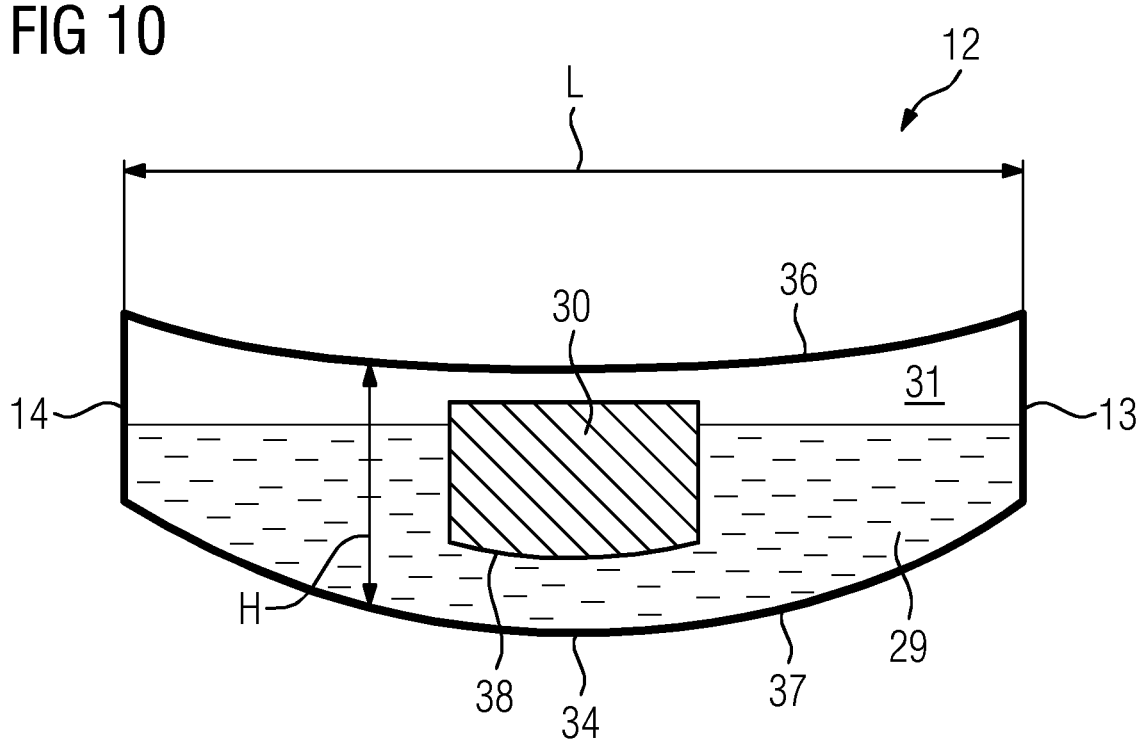
FIG. 10 shows a cross-section VII-VII from FIG. 4 of a further embodiment of the container.

FIG. 10 shows the longitudinal section VII-VII from FIG. 4 of a further embodiment of the container 12. In contrast to FIG. 9, the ceiling face 36 has a curved shape. The ceiling face 36 is concave when looking from above.

Figure 11:
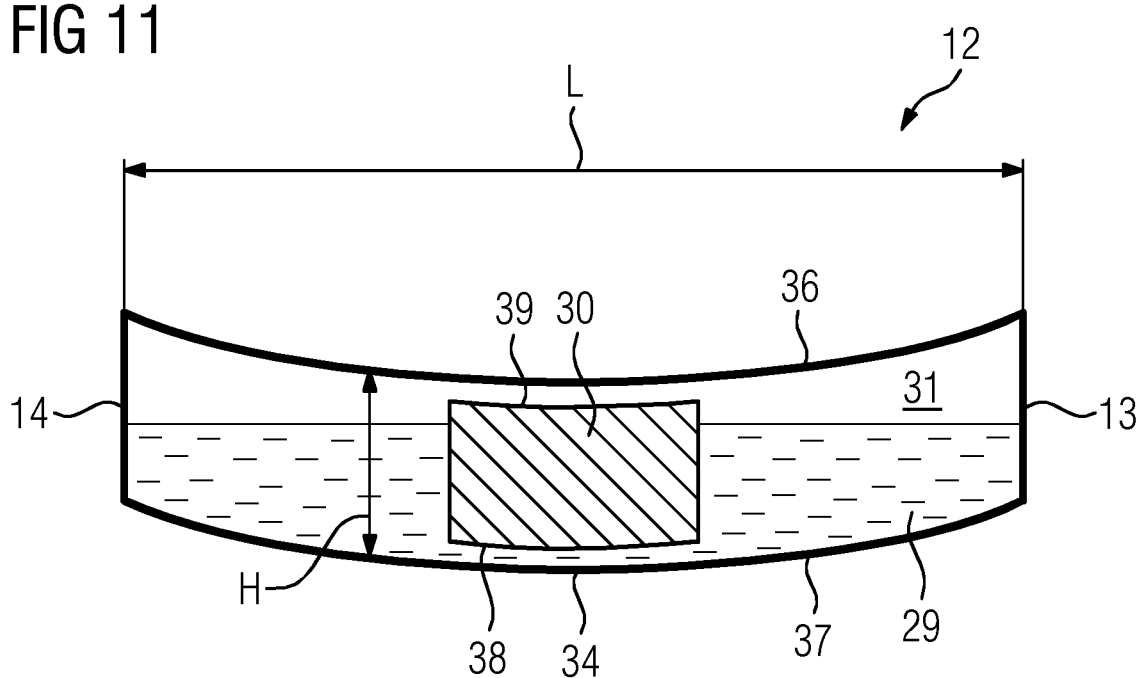
FIG. 11 shows a cross-section VII-VII from FIG. 4 of a further embodiment of the container.

FIG. 11 shows the longitudinal section VII-VII from FIG. 4 of a further embodiment of the container 12. In contrast to FIG. 10, the inner space 31 of the container 12 comprises the height H which is constant along the length L of the container 12. Further, a top face 39 of the damping body 30 has a curved shape. The top face 39 is concave when looking from above.

Figure 12:
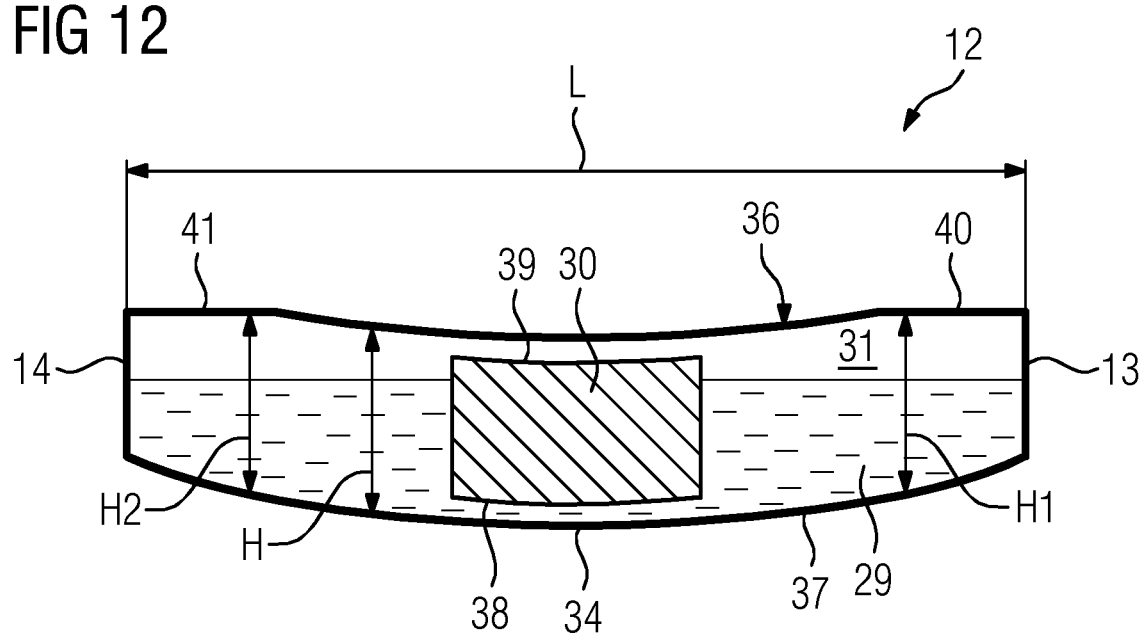
FIG. 12 shows a cross-section VII-VII from FIG. 4 of a further embodiment of the container.

FIG. 12 shows the longitudinal section VII-VII from FIG. 4 of a further embodiment of the container 12. In contrast to FIG. 11, the ceiling face 36 comprises a flat portion 40 arranged at one side (right-side) of the ceiling face 36 and a flat portion 41 arranged the other side (left-side) of the ceiling face 36. A height H1 of the inner space 31 at the flat portion 40 decreases towards the end face 13. A height H2 of the inner space 31 at the flat portion 41 decreases towards the end face 14. The height H of the inner space 31 between the flat portions 40, 41 may be essentially constant.

The heights H1, H2 of the container 12 vary, in particular such that the height gradually decreases towards the end faces 13, 14. Thus, cross-sectional areas of the container 12 gradually decrease towards the end faces 13, 14. This has the advantage that when the wind turbine 1 moves in one direction the damping body 30 and liquid 29 move in a counteractive direction such that the damping body 29 pushes parts of the liquid 29 in front of it creating a liquid "buffer zone" at the respective end face 13, 14.

The liquid "buffer zone" will slow and stop the damping body 30 as it moves towards the end face 13, 14. In particular, the damping body 30 is so designed that it essentially matches the container cross-section but remain free moving so as to enable the damping body 30 to push towards the liquid 29 without too much liquid 29 simply just flowing across the damping body 30 since this reduces the "buffer zone" effect.

Alternatively, or additionally, an end-stop or breaking mechanism (not shown) at both end faces 13, 14 may be provided for preventing the damping body 30 from damaging the end faces 13, 14 of the container 12 because great force may occur due to collisions between the damping body 30 and the end faces 13, 14. Such end-stops may comprise compressible material, e.g. a rubber material, or high friction material placed at any side of the container 12.

Figure 13:
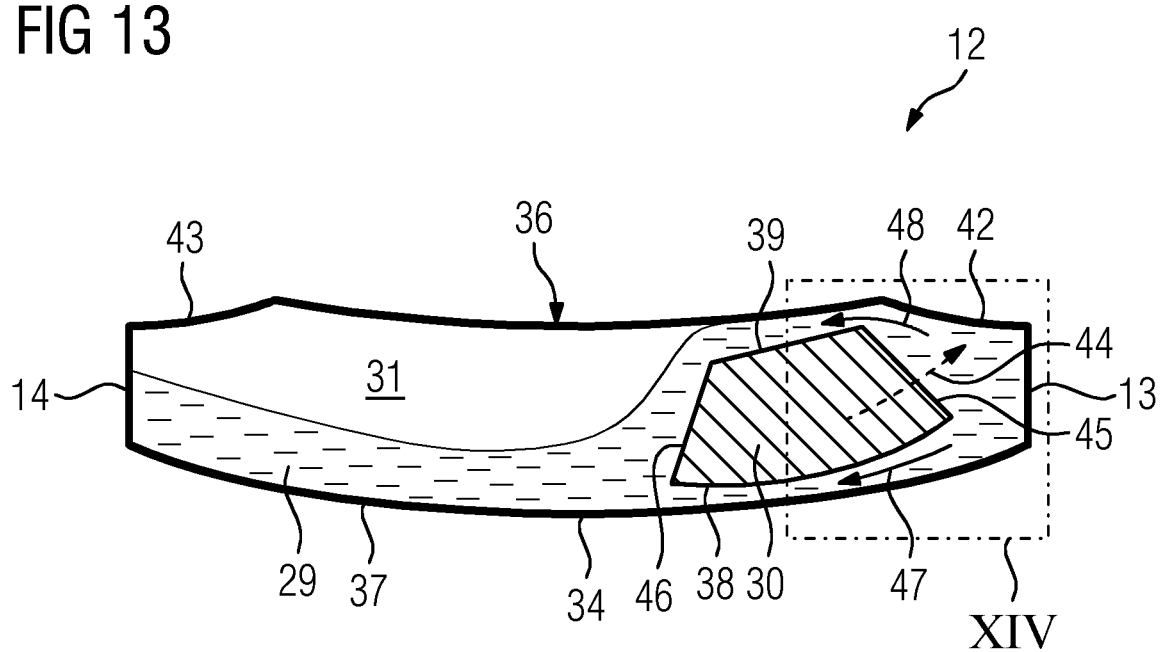
FIG. 13 shows a cross-section VII-VII from FIG. 4 of a further embodiment of the container.

FIG. 13 shows the longitudinal section VII-VII from FIG. 4 of a further embodiment of the container 12. In contrast to FIG. 12, the damping body 30 is shown at a position which is near to the end face 13 while moving towards the end face 13 (see broken arrow 44). Further, the ceiling face 36 comprises a curved portion 42 instead of the flat portion 40 and a curved portion 43 instead of flat portion 41. Furthermore, the top face 39 of the damping body 30 is essentially flat. Moreover, the damping body 30 has an essentially trapezoidal longitudinal section, wherein the bottom face 38 is curved. The damping body 30 comprises end faces 45, 46 which are averted from each other. Further, an end face 45 of the damping body 30 faces the end face 13 of the container 12. Furthermore, an end face 46 of the damping body 30 faces the end face 14 of the container 12. As shown in FIG. 13, when the damping body 30 moves towards the end face 13, fluid 29 is dammed between an end face 45 of the damping body 30 and the end face 13 of the container 12 e.g. forming a fluid front.

Furthermore, a fluid flow 47 flows contrary to the movement (see arrow 44) of the damping body 30 between the bottom face 38 and the floor face 37 causing an increase of fluid friction and thus an increased damping effect. Moreover, a fluid flow 48 may flow contrary to the movement (see arrow 44) of the damping body 30 between the top face 39 and the ceiling face 36 causing an increase of fluid friction and thus an increased damping effect. This effect may also occur between side walls 57, 58 (see FIG. 16) of the container 12 and side faces 55, 56 (see FIG. 16) of the damping body 30.

In particular, any air caught between the fluid front and damping body 30 would also contribute to this counter active effect towards the movement (see arrow 44).

Figure 14:
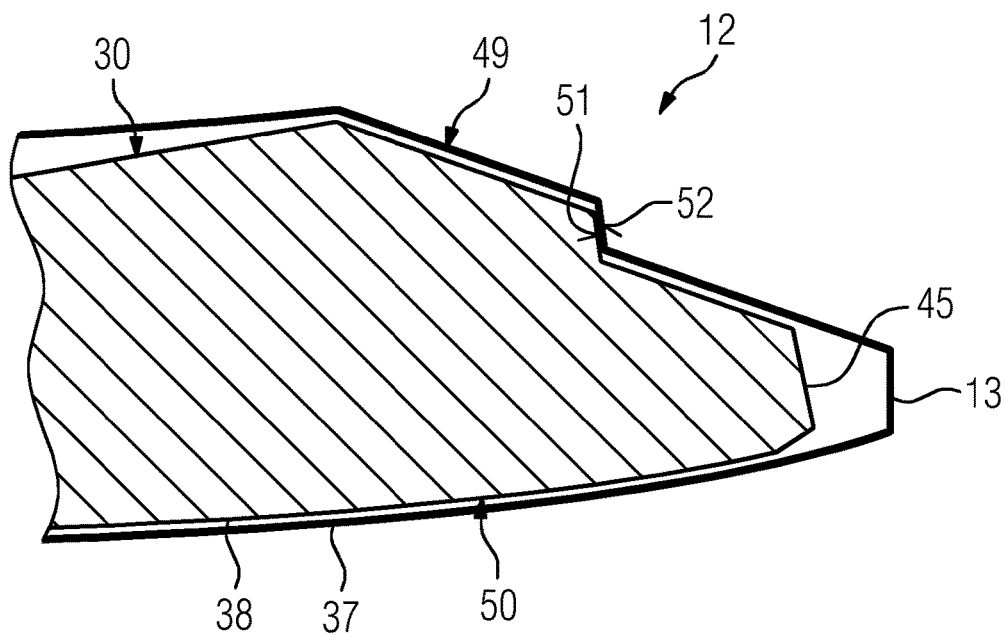
FIG. 14 shows detail view XIV from FIG. 13 of a further embodiment of the container.

FIG. 14 shows detail view XIV from FIG. 13 of a further embodiment of the container 12. In contrast to FIG. 13, the container 12 comprises an end portion 49 and the damping body 30 comprises an end portion 50 for fitting into the end portion 49 of the container 12, wherein the container 12 and the damping body 30 are configured such that fluid 29 is dammed between the end face 45 of the damping body 30 and the end face 13 of the container 12 when the end portion 50 of the damping body 30 fits into the end portion 49 of the container 12.

Moreover, the end portion 49 comprises a contact surface 51 and the end portion 50 comprises a contact surface 52, wherein the contact surface 52 is configured to touch the contact surface 51 for defining an end position of the damping body 30 inside the container 12. In particular, the end portion 49 forms essentially a negative form of the end portion 50. The contact surfaces 51, 52 are arranged essentially perpendicular to the floor face 37 and/or the bottom face 38.

The end portion 50 is shaped such that it essentially does not touch any surface of the end portion 49 apart from the floor face 37, the contact surface 51 and for example side walls 57, 58 (see FIG. 16). This design may in the end position prevent the damping body 30 from getting stuck between the ceiling face 36 and floor face 37 of the container 12.

Figure 15:
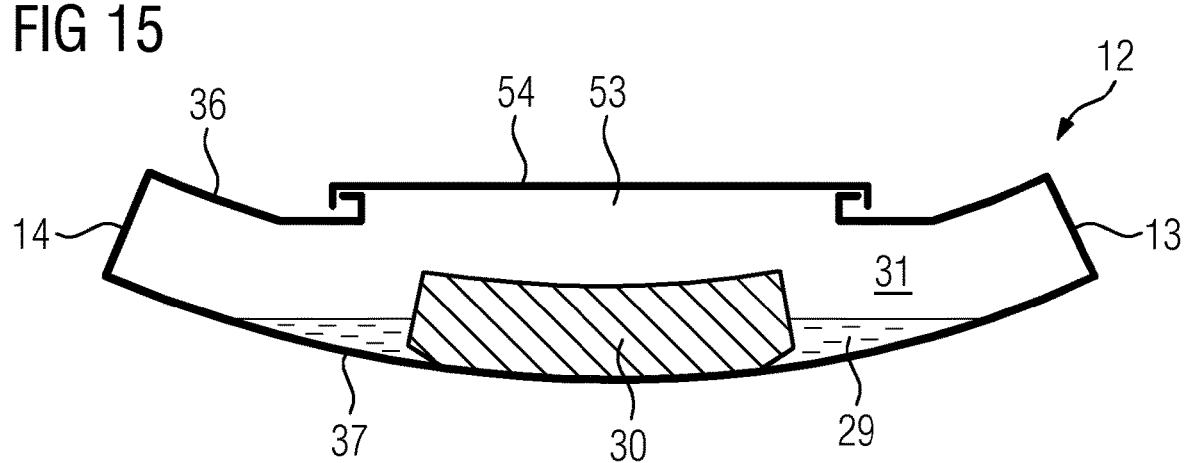
FIG. 15 shows a cross-section VII-VII from FIG. 4 of a further embodiment of the container.

FIG. 15 shows the longitudinal section VII-VII from FIG. 4 of a further embodiment of the container 12. The container 12 is a closed structure for keeping the fluid 29 inside the inner space 31. However, the container 12 may comprise an opening 53 at the ceiling face 36 for placing the fluid 29 and the damping body 30, in particular from above, inside the container 12. Moreover, this opening 53 may be used for service purposes. Further, a cap 54 may be provided for closing the opening 53.

The container material could be any material, e.g. a metal casing or made of a composite material or the like. The damping body 30 is a durable high-density material, e.g. a metal such as iron or lead. A heavy damping body 30 is provided to get a better damping effect. In particular, the damping body 30 is easily grinded or polished to provide a smooth sliding surface 33 to ease the sliding movement. The damping body 30 comprises an outer coating or cover material for achieving a reduced friction such as Teflon or other polymeric material.

In an alternative embodiment, the damping body 30 is placed on (e.g. a plate) or within a box (e.g. a casing) that may provide a low friction contact point between the container 12 and damping body 30. Further, the materials should be chosen as not to deteriorate or erode over time under the influence of the fluid 29 in the container 12 because the sliding movement may increase such effects. The fluid is e.g. an oil which may prevent the damping body 30 from getting in contact with the container 12 to a great extend upon its sliding movement.

In particular, the damping body 30 may be a solid structure provided as one piece element, but can also be made of separate elements stacked next or on top of one another and joined together to form one structure.

In particular, the fluid 29 may be water optionally comprising a number of different agents e.g. salts. The agent is sodium chloride because it is environmentally harmless and because the solubility of sodium chloride in water hardly changes with the temperature so that crystallization will not occur in the container 12. Sodium chloride both lowers the freezing temperature of the water and increases the density.

The agent is zinc chloride and/or ferrous sulphate and/or ferrous nitrate having a cost advantage. Further, the agent may by glycerol. As fluid 29 oils may be used. Examples of such oils could be a mineral, animal or vegetable oil. Such oil fulfills at least one of the following properties:
   i) higher density than water,
   ii) non-flammable,
   iii) low volatility,
   iv) low freezing point,
   v) of a viscosity that,
      a) provides a free-flowing fluid 29 mass with a relatively quick response to the oscillations,
      b) allows the damping body 30 to slide easily—even at low temperatures, or
      c) sufficiently high to effectively contribute to the "buffer zone" effect and assist in slowing down the damping body 30 (end-stop effect).

The container 12 is placed on a platform or support beams designated to be attached to the tower 4 or the nacelle 3. The time of placement can be done after a given tower 4 has been placed on a wind turbine foundation (on- or off-shore), but pre-assembled in that section before the tower 4 is installed.

FIG. 16 shows a cross-sectional view XVI-XVI from FIG. 7 of a further embodiment of the container 12, wherein container 12 and the damping body 30 are intersected. The container 12 has an elongated shape, wherein a length L of the container 12 is at least two, three, four, five, six, seven, eight, nine or even ten times larger than a width W and/or height V of the container 12. In particular, a cross-section of the damping body 30 fills at least 30%, 40%, 50%, 60%, 70%, 80%, 90%, 95% or 98% of a cross-section of the container 12. The damping body 30 comprises side faces 55, 56 which are averted from each other and arranged essentially perpendicular to the top face 39 and/or the bottom face 38. Further, the container 12 comprises a side wall 57 facing the side face 55 and a side wall 58 facing the side face 56. The damping body 30 has essentially a rectangular cross-sectional shape. The container 12 has essentially a rectangular cross-sectional shape.

FIG. 17 shows the cross-sectional view XVI-XVI from FIG. 7 of a further embodiment of the container 12. In contrast to FIG. 16, both the damping body 30 and the container 12 have a quadratic cross-sectional shape.

FIG. 18 shows the cross-sectional view XVI-XVI from FIG. 7 of a further embodiment of the container 12. In contrast to FIG. 16, the bottom face 38 and the floor face 37 are roof shaped. The damping body 30 has a pentagonal cross-sectional shape.

FIG. 19 shows the cross-sectional view XVI-XVI from FIG. 7 of a further embodiment of the container 12. In contrast to FIG. 16, the bottom face 38 is convex when looking from below and the floor face 37 is concave when looking from above.

FIG. 20 shows the cross-sectional view XVI-XVI from FIG. 7 of a further embodiment of the container 12. In contrast to FIG. 16, the side faces 55, 56 are concave when looking thereon. Further, side walls 57, 58 are convex when looking from the inner space 31.

FIG. 21 shows the cross-sectional view XVI-XVI from FIG. 7 of a further embodiment of the container 12. In contrast to FIG. 16, the bottom face 38 and the top face 39 are convex when looking thereon. Further, the ceiling face 36 and floor face 37 are concave when looking from the inner space 31.

FIG. 22 shows the cross-sectional view XVI-XVI from FIG. 7 of a further embodiment of the container 12. In contrast to FIG. 16, the bottom face 38 is convex when looking thereon. Further, floor face 37 is concave when looking from the inner space 31. The top face 39 has a triangular cavity in the cross-sectional view. Further, the ceiling face 36 is adapted to the top face 39.

FIG. 23 shows the cross-sectional view XVI-XVI from FIG. 7 of a further embodiment of the container 12. In contrast to FIG. 16, the damping body 30 comprises a recess 59 at the bottom face 38 and the container 12 comprises a guiding element 60 at the floor face 37 which interacts with, in particular protrudes in, the recess 59 for guiding the damping body 30 along the length L of the container 12. The guiding element 60 has a trapezoidal cross-sectional shape. The bottom face 38 is adapted to the guiding element 60.

FIG. 24 shows the cross-sectional view XVI-XVI from FIG. 7 of a further embodiment of the container 12. In contrast to FIG. 23, two of such guiding elements 60 at the floor face 37 and two of such recesses 59 at the bottom face 38 are provided, wherein the guiding elements 60 have a triangular cross-sectional shape.

FIG. 25 shows the cross-sectional view XVI-XVI from FIG. 7 of a further embodiment of the container 12. In contrast to FIG. 24, three of such guiding elements 60 and three of such recesses 59 are provided. The guiding elements 60 are provided at the side walls 57, 58 and the floor face 37. The recesses 59 are provided at side faces 55, 56 and the bottom face 38.

FIG. 26 shows the cross-sectional view XVI-XVI from FIG. 7 of a further embodiment of the container 12. In contrast to FIG. 24, the top face 39 is concave when looking from above and the bottom face 38 is convex when looking from below. Further, the ceiling face 36 and the floor face 37 are adapted respectively.

FIG. 27 shows the cross-sectional view XVI-XVI from FIG. 7 of a further embodiment of the container 12. In contrast to FIG. 23, four of such guiding elements 60 and four of such recesses 59 are provided. The guiding elements 60 are provided at the side walls 57, 58 and two guiding elements 60 are provided at the floor face 37. The corresponding recesses 59 are provided at the side faces 55, 56 and the bottom face 38. The guiding elements 60 and the recesses 59 are rounded.

FIG. 28 shows the cross-sectional view XVI-XVI from FIG. 7 of a further embodiment of the container 12. In contrast to FIG. 23, the guiding element 60 is dovetail shaped, wherein the recess 59 is adapted thereto.

FIG. 29 shows the cross-sectional view XVI-XVI from FIG. 7 of a further embodiment of the container 12. In contrast to FIG. 20 each side wall 57, 58 comprises a guiding element 60 and each side face 55, 56 comprises a corresponding recess 59.

The guiding elements 60 may be named rail system which extend along the length L of the container (in total or in part). The function may be to guide the damping body 30 during sliding within the container 12. The guiding elements 60 may also be characterized as sidewall protection means and/or sliding pads for the damping body 30. Such guiding elements 60 may be placed along the inner space 31 of the container 12 at any side, and would thus prevent the damping body 30 from scraping against the walls. Such guiding elements 60 may be provided separately from the container 12 or may be formed inside the container 12 as integral part thereof. The guiding elements 60 are exchangeable in part or in total.

FIG. 30 shows the cross-sectional view XVI-XVI from FIG. 7 of a further embodiment of the container 12. In contrast to FIG. 16, the damping body 30 and the container 12 have a circular cross-sectional shape. Moreover, four guiding elements 60 are dispersed along a circumference of the container 12 touching the damping body 30. The guiding elements 60 taper towards the damping body 30.

FIG. 31 shows the cross-sectional view XVI-XVI from FIG. 7 of a further embodiment of the container 12. In contrast to FIG. 27, the ceiling face 36 comprises a further guiding element 60. Moreover, recesses 59 are not provided at the damping body 30.

FIG. 32 shows the cross-sectional view XVI-XVI from FIG. 7 of a further embodiment of the container 12. In contrast to FIG. 16, the bottom face 38 is concave when looking from below and the floor face 37 is convex when looking from above.

Figure 33:
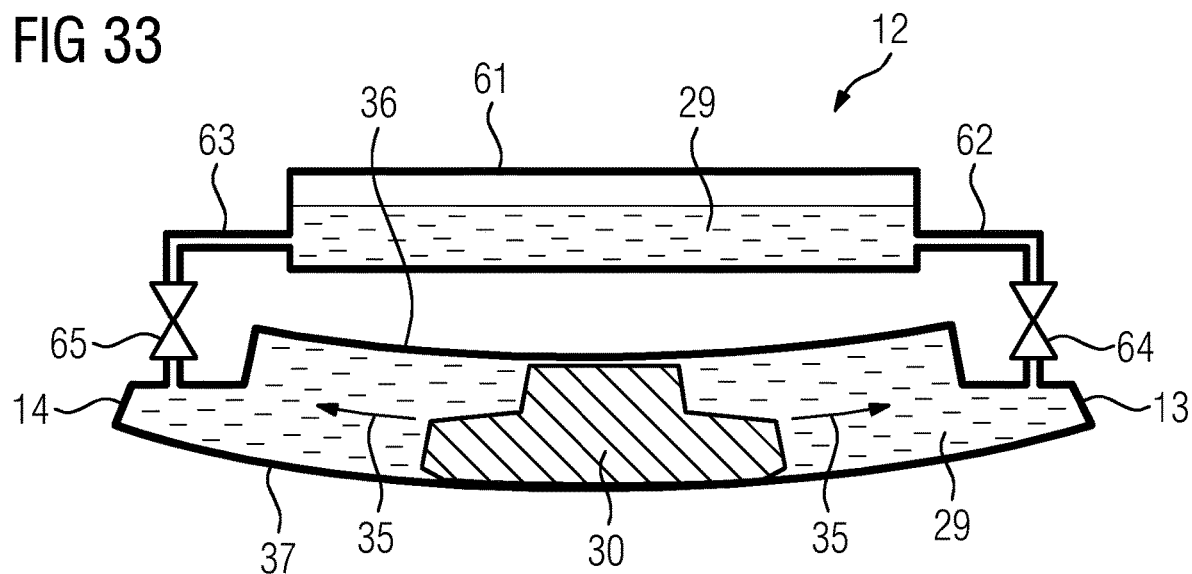
FIG. 33 shows a cross-section VII-VII from FIG. 4 of a further embodiment of the container.

FIG. 33 shows the longitudinal section VII-VII from FIG. 4 of a further embodiment of the container 12. The container 12 further comprises a compensation container 61. The compensation container 61 is connected to the container 12 by means of two ducts 62, 63. A first duct 62 is connected to the container 12 close to the first end face 13. A second duct 63 is connected to the container 12 close to the second end face 14. Each duct 62, 63 comprises a valve 64, 65. The valves 64, 65 control the flow speed of the fluid 29 and thereby the damping body 30. The damping body 30 can be immersed in the fluid 29 completely or only partly.

Figure 34:
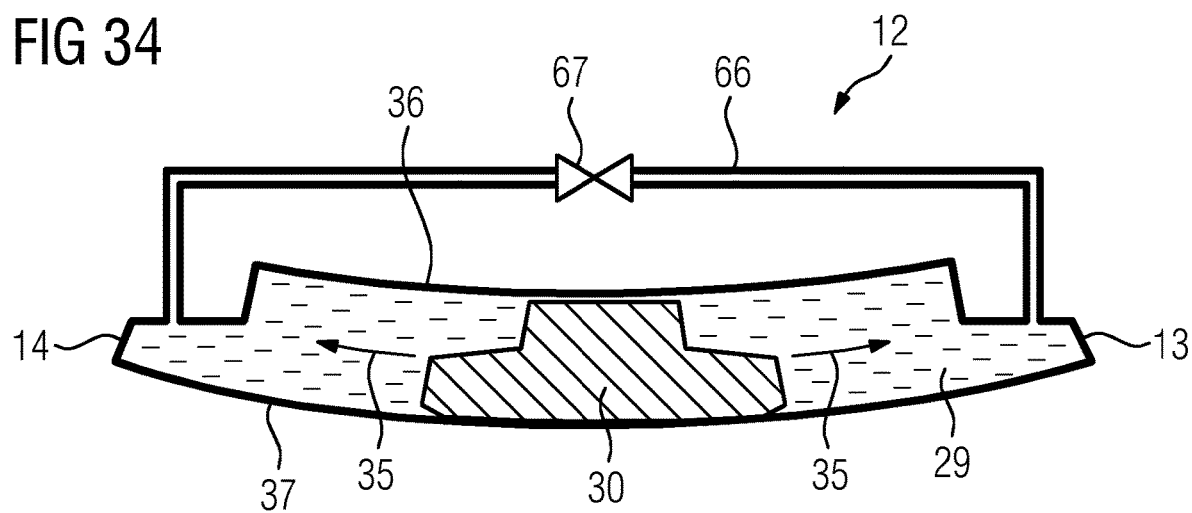
FIG. 34 shows a cross-section VII-VII from FIG. 4 of a further embodiment of the container.

FIG. 34 shows the longitudinal section VII-VII from FIG. 4 of a further embodiment of the container 12. The container 12 according to FIG. 34 differs from the container 12 according to FIG. 33 in that it does not have a compensation container 61 but only one duct 66 with a valve 67. The duct 66 is connected to the container 12 both close to the first end face 13 and to the second end face 14 thereof.

Figure 35:
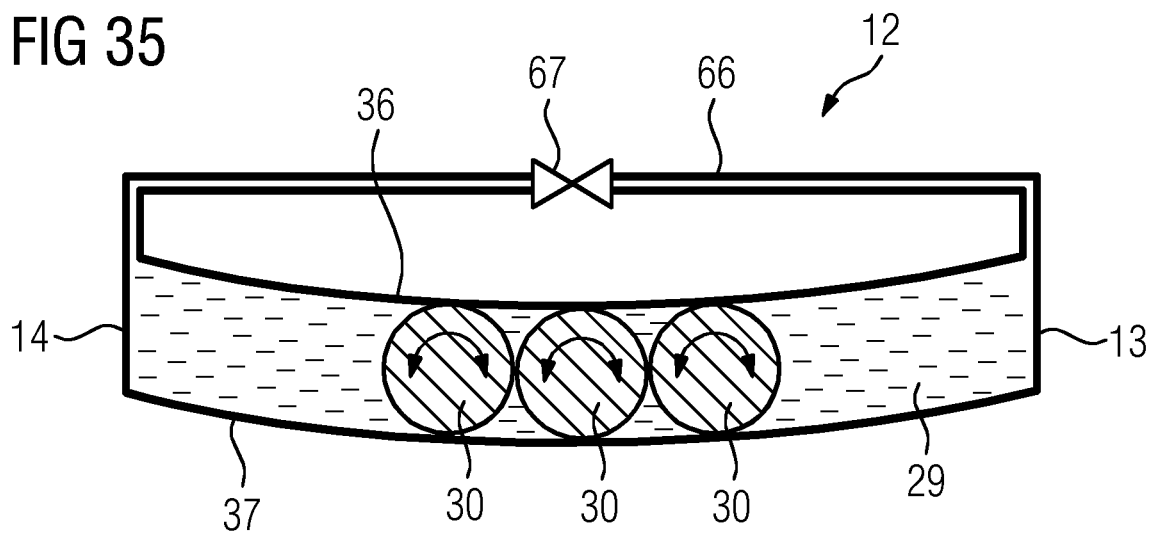
FIG. 35 shows a cross-section VII-VII from FIG. 4 of a further embodiment of the container.

FIG. 35 shows the longitudinal section VII-VII from FIG. 4 of a further embodiment of the container 12. The container 12 according to FIG. 35 differs from the container 12 according to FIG. 34 in that there is not only provided one damping body 30 but more than one, for example three. The damping bodies 30 are in the form of rollers or cylinders and can rotate inside the container 12. The fluid 29 can be controlled by one or more valves 67.

Figure 36:
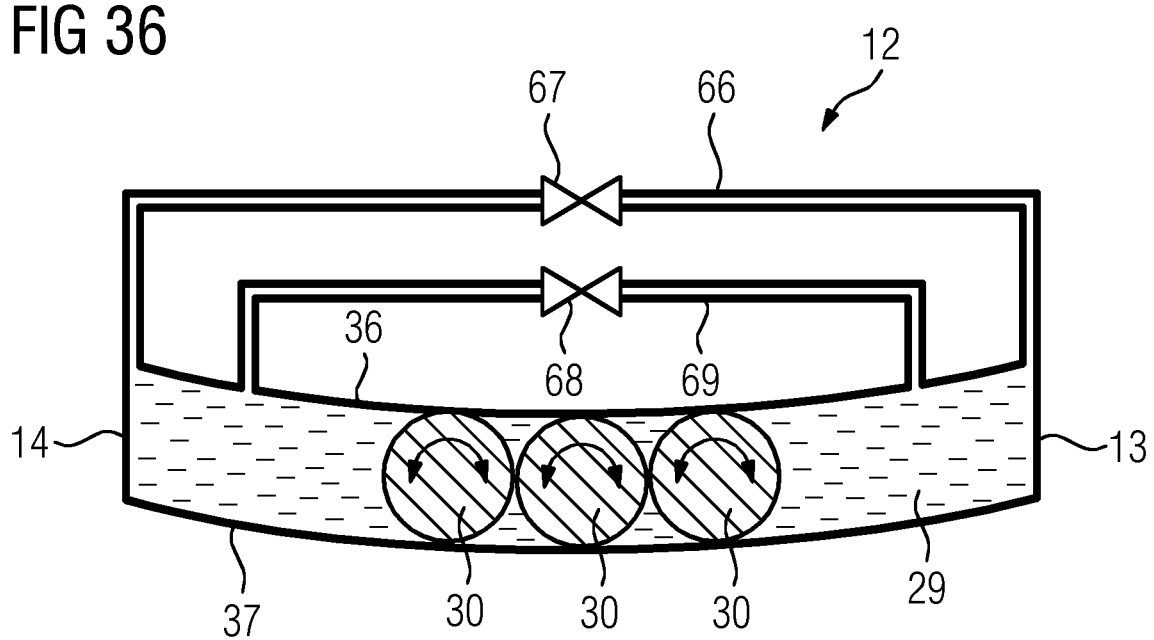
FIG. 36 shows a cross-section VII-VII from FIG. 4 of a further embodiment of the container.

FIG. 36 shows the longitudinal section VII-VII from FIG. 4 of a further embodiment of the container 12. The container 12 according to FIG. 36 differs from the container 12 according to FIG. 35 in that there is provided a separate end-stop-valve 68 which is connected to the ceiling face 36 by means of a duct 69.

It is understood that all features described regarding the container 12, the damping body 30 and the fluid 29 also apply mutatis mutandis to the containers 16, 17, 18, 19, 27, 28.

Although the present invention has been disclosed in the form of preferred embodiments and variations thereon, it will be understood that numerous additional modifications and variations could be made thereto without departing from the scope of the invention.

For the sake of clarity, it is to be understood that the use of 'a' or 'an' throughout this application does not exclude a plurality, and 'comprising' does not exclude other steps or elements.

The invention claimed is:

1. A wind turbine comprising
at least one container;
a fluid arranged inside the container; and
a damping body arranged inside the container, which is immersed in the fluid, and configured to move inside the container, wherein the fluid and the damping body are configured to damp oscillations of the wind turbine;
wherein the container and the damping body are configured such that a full rotation of the damping body inside the container is prevented;
wherein a moving path of the damping body within the container extends from a first end face to a second end face opposite the first end face;
wherein the container comprises a sliding surface for the damping body, the sliding surface having a curved shape.

2. The wind turbine according to claim 1, further comprising a tower, wherein the container is arranged inside the tower.

3. The wind turbine according to claim 1, wherein a cross-section of the damping body fills at least 30%, 40%, 50%, 60%, 70%, 80%, 90%, 95% or 98% of a cross-section of the container.

4. The wind turbine according to claim 1, wherein a sliding surface of the damping body has a curved shape.

5. The wind turbine according to claim 1, wherein the damping body has a square, pentagonal, rectangular or trapezoidal cross-sectional shape.

6. The wind turbine according to claim 1, wherein one of the damping body and the container comprises a recess and the other of the damping body and the container comprises a guiding element which interacts with the recess for guiding the damping body along a length of the container.

7. The wind turbine according to claim 1, wherein the container comprises an end portion and the damping body comprises an end portion for fitting into the end portion of the container, wherein the container and the damping body are configured such that fluid is dammed between an end face of the damping body and an end face of the container when the end portion of the damping body fits into the end portion of the container.

8. The wind turbine according to claim 1, wherein an inner space of the container comprises a height that is constant along a length of the container or which decreases along the length of the container.

9. The wind turbine according to claim 8, wherein at least 10%, 20%, 30%, 40%, 50%, 60%, 70%, 80% or 90% of the inner space of the container is filled with the fluid.

10. The wind turbine according to claim 1, further comprising a first container and a first damping body which is arranged with the fluid inside the first container, and a second container and a second damping body which is arranged with the fluid inside the second container.

11. The wind turbine according to claim 10, wherein the first container crosses the second container.

12. The wind turbine according to claim 10, wherein the first container is arranged parallel to the second container.

13. The wind turbine according to claim 12, further comprising a cable which is arranged between the first container and the second container.

14. A wind turbine comprising
at least one container;
a fluid arranged inside the container; and
a damping body arranged inside the container, which is immersed in the fluid, and configured to move inside the container, wherein the fluid and the damping body are configured to damp oscillations of the wind turbine;
wherein the container and the damping body are configured such that a full rotation of the damping body inside the container is prevented;
wherein a moving path of the damping body within the container extends from a first end face to a second end face opposite the first end face;
wherein one of the damping body and the container comprises a recess and the other of the damping body and the container comprises a guiding element which interacts with the recess for guiding the damping body along a length of the container.

15. A wind turbine comprising
a first container;
a fluid arranged inside the first container;
a first damping body arranged inside the first container, which is immersed in the fluid, and configured to move inside the first container, wherein the fluid and the first damping body are configured to damp oscillations of the wind turbine;
a second container arranged parallel to the first container; and
a second damping body arranged inside the second container, which is immersed in a fluid within the second container, and configured to move inside the second container, wherein the fluid and the second damping body are configured to damp oscillations of the wind turbine;
wherein the first container and the first damping body are configured such that a full rotation of the first damping body inside the first container is prevented;
wherein a moving path of the first damping body within the container extends from a first end face to a second end face opposite the first end face.

* * * * *